United States Patent
Suresh

(10) Patent No.: US 9,743,402 B2
(45) Date of Patent: Aug. 22, 2017

(54) POLYMORPHISM AND PRIORITY INVERSION TO HANDLE DIFFERENT TYPES OF LIFE STYLE AND LIFE SAFETY TRAFFIC IN WIRELESS SENSOR NETWORK FOR A CONNECTED HOME

(71) Applicant: Honeywell International Inc., Morristown, NJ (US)

(72) Inventor: Sandeep Suresh, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 423 days.

(21) Appl. No.: 14/452,587

(22) Filed: Aug. 6, 2014

(65) Prior Publication Data

US 2016/0044661 A1    Feb. 11, 2016

(51) Int. Cl.
  *H04W 72/04* (2009.01)
  *H04B 7/26* (2006.01)
  (Continued)

(52) U.S. Cl.
  CPC ...... *H04W 72/0446* (2013.01); *H04B 7/2656* (2013.01); *H04W 4/001* (2013.01); *H04W 16/16* (2013.01); *H04W 72/10* (2013.01); *H04W 72/1215* (2013.01); *H04W 72/1242* (2013.01); *H04W 72/1247* (2013.01); *H04W 84/12* (2013.01); *H04W 84/18* (2013.01)

(58) Field of Classification Search
  None
  See application file for complete search history.

(56) References Cited

U.S. PATENT DOCUMENTS

| | | | | |
|---|---|---|---|---|
| 2002/0059434 A1* | 5/2002 | Karaoguz | ........... | H04L 12/5692 709/228 |
| 2005/0020299 A1* | 1/2005 | Malone | ................. | H04W 48/18 455/552.1 |

(Continued)

FOREIGN PATENT DOCUMENTS

EP    2 384 078 A1    11/2011

OTHER PUBLICATIONS

Extended European search report from corresponding EP patent application 15178738.9, dated Jan. 21, 2016.

*Primary Examiner* — Shaq Taha
*Assistant Examiner* — Ronald h Davis
(74) *Attorney, Agent, or Firm* — Husch Blackwell LLP

(57) ABSTRACT

A system is provided that includes a control panel having first and second wireless transceivers, a beacon processor of the control panel that transmits a beacon through the first wireless transceiver, wherein the beacon defines a repeating superframe having a first time period and a second time period, a plurality of wireless devices that exchange messages with the control panel within a respective TDMA slots of the repeating superframe, and an access processor within the control panel that dynamically adjusts relative sizes of the first and second time periods to reduce or exclude WiFi access by portable user devices based upon a status of the plurality of wireless devicess wherein use of the second time period is polymorphic under IEEE 802.11 and IEEE 802.15A protocols, and wherein relative priorities of the first and second time periods are inverted during transmissions between the control panel and other devices of the control panel.

16 Claims, 3 Drawing Sheets

(51) Int. Cl.
   *H04W 4/00*     (2009.01)
   *H04W 72/10*    (2009.01)
   *H04W 16/16*    (2009.01)
   *H04W 72/12*    (2009.01)
   *H04W 84/12*    (2009.01)
   *H04W 84/18*    (2009.01)

(56) References Cited

U.S. PATENT DOCUMENTS

| | | | |
|---|---|---|---|
| 2007/0268884 A1 | 11/2007 | Kolavennu et al. | |
| 2008/0089311 A1* | 4/2008 | Roy | H04B 7/2612 |
| | | | 370/345 |
| 2009/0213822 A1* | 8/2009 | Keshavarzian | H04L 47/10 |
| | | | 370/338 |
| 2009/0219916 A1* | 9/2009 | Bohn | H04W 74/0816 |
| | | | 370/347 |
| 2012/0033027 A1* | 2/2012 | Murphy | H04N 7/147 |
| | | | 348/14.01 |
| 2013/0176161 A1* | 7/2013 | Derham | G01S 7/36 |
| | | | 342/27 |
| 2013/0250865 A1* | 9/2013 | Ryan | H04W 12/06 |
| | | | 370/329 |
| 2016/0329722 A1* | 11/2016 | Andrews | H02J 4/00 |

* cited by examiner

POLYMORPHISM AND PRIORITY INVERSION TO HANDLE DIFFERENT TYPES OF LIFE STYLE AND LIFE SAFETY TRAFFIC IN WIRELESS SENSOR NETWORK FOR A CONNECTED HOME

FIELD

The field of this invention relates to sensor systems and, more particularly, to networked sensor systems.

BACKGROUND

Systems are known to detect threats within secured areas. Threats may be based upon any of a number of different risks to human safety or security (e.g., fire, carbon monoxide, unauthorized intruders, etc.).

Security systems are typically based upon the use of one or more sensors that detect a specific threat within an area. The sensors may be fixed devices and/or mobile devices, such as a fob. For example, fire, smoke, and/or intrusion sensors may be distributed throughout a secured area in order to mitigate damage through the early detection of fire or intrusion. The sensors can be supervised or unsupervised.

In most cases, the sensors may be monitored by a control panel. In the event that one of the sensors is activated, the control panel may activate a local audible alarm to warn occupants in the area of the threat. The control panel may also send an alarm message to a central monitoring station. A portable device, such as key fob, may be used to send emergency alerts (e.g., panic alarms, medical alerts, police, etc.) to the control panel and also to send commands (e.g., arm, disarm, etc.) to the control panel. The control panel may also include a keypad and an audible siren.

In the case of industrial or public spaces, security systems may cover large areas and incorporate hundreds or even thousands of sensors. In order to accommodate such large numbers of devices, the control panel and the sensors may be connected via a wireless interface.

However, security systems are often difficult to set up and use with such large number of sensors. Accordingly, a need exists for better methods of maintaining contact among the control panel, the sensors, and the central monitoring station of wireless security systems.

DETAILED DESCRIPTION

Figure 1:
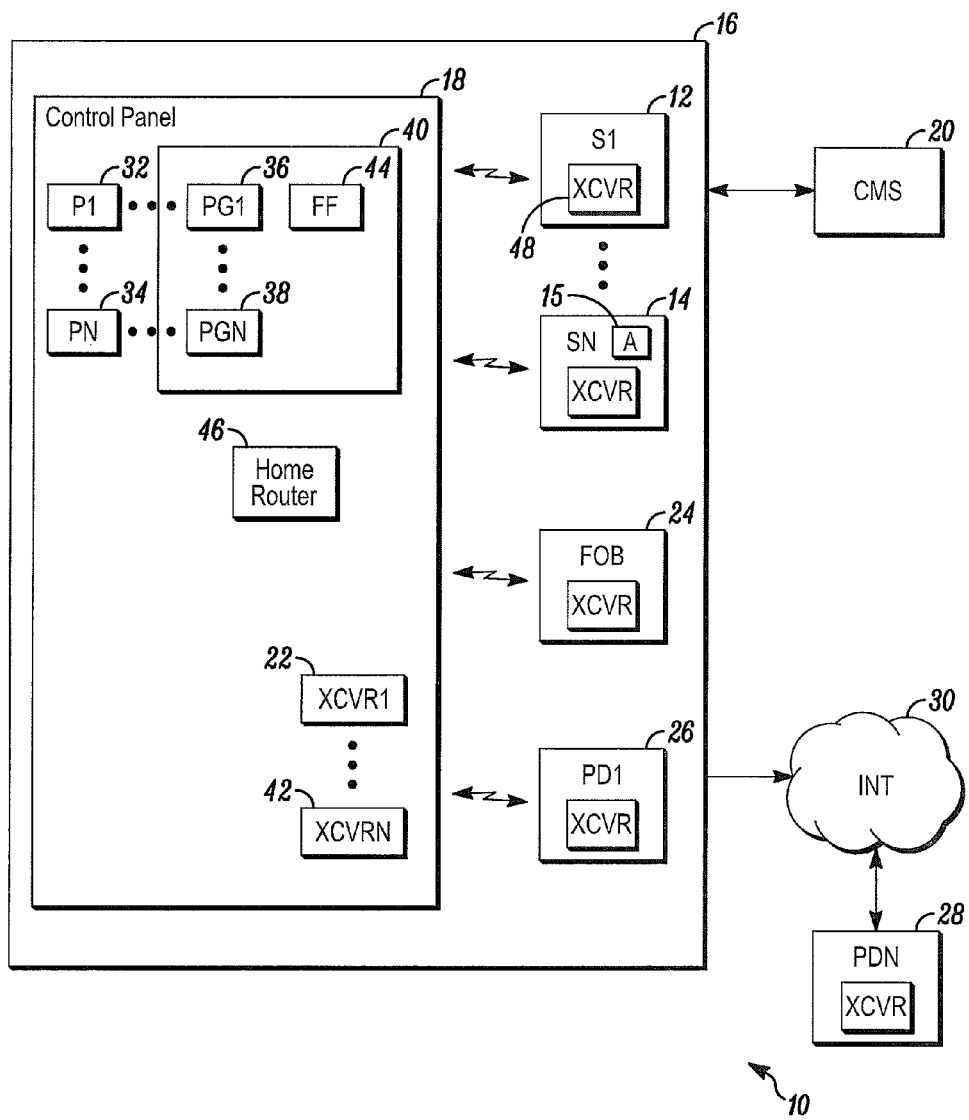
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiment illustrated.

FIG. 1 is a block diagram of a security system 10 shown generally in accordance with an illustrated embodiment. Included within the security system may be one or more wireless sensors 12, 14 that monitor a secured area 16 for threats.

The sensors may be based upon any of a number of different sensing technologies. For example, one or more of the sensors may be fire, smoke, or gas detectors. Some other ones of the sensors may be intrusion detectors. The sensors may also be provided with respective audible or visual alerting devices 15 that alert human occupants to danger. The security system may also include other wireless devices, such as key fobs or keypads.

The sensors may be monitored for activation by a control panel 18 containing a radio or a gateway. The control panel may be located within the secured area as shown in FIG. 1 or may be located remotely from the secured area.

Upon activation of one of the sensors, the control panel may send an alarm message to a central monitoring station 20. The alarm message may include an identifier of the security system (e.g., account number, address, etc.), an identifier of the type of activated sensor, a system or zone identifier of the activated sensor, and a time of activation of the activated sensor.

The central monitoring station may respond by summoning the appropriate help. For example, if the activated sensor is determined to be a fire sensor, then the central monitoring station may summon a local fire department. On the other hand, if the activated sensor is identified to be an intrusion sensor, then the central monitoring station may summon the police.

All of the sensors may be coupled to the control panel via a wireless interface. In this regard, radio frequency (rf) transceivers 22, 48 within the control panel and each of the sensors may form a portion of the wireless interface that allows each of the sensors to exchange messages with the control panel.

The security system may also include one or more wireless fobs 24 and/or wireless key pads 24 that are used to control a state of the security system (e.g., armed, disarmed, armed away, etc.). Each of the fobs may include a user interface (e.g., pushbuttons, LED indicators, etc.) and a wireless rf transceiver that allows each of the fobs to exchange control messages with the control panel. Each of the key pads may also include a user interface (e.g., keyboard and display) and a wireless rf transceiver that allows each of the key pads to exchange control messages with the control panel.

Also included within the secured area may be one or more portable wireless devices (e.g., iPhones, Android devices, etc.) 26. The portable devices 26 may exchange data with one or more other devices 28 through the Internet 30 under an appropriate format (e.g., TCP/IP, etc.). As used herein, the portable devices 26 are referred to as "life style applications" while the sensors 12, 14, 24 are referred to as "life safety applications."

The portable wireless devices 26 may exchange signals through the Internet via one or more WiFi transceivers 42 located within the secured area. The WiFi transceivers may be coupled to a local Internet service provider via a home router 46 and a hardwired connection between the control panel and the local Internet service provider.

Included within the control panel, the sensors, the fob and portable wireless devices is control circuitry that may also include one or more processor apparatuses (processors) 32, 34 each operating under control of one or more computer programs loaded from a non-transitory computer readable medium (memory) 40. As used herein, reference to a step performed by a computer program is also reference to the processor that executed that step.

Included within the control panel may be one or more communication processors that define a superframe for communication between the control panel, the sensors, the fobs, and the portable wireless devices.

The superframe may be defined by first and second time periods. The first time period may be divided into a number of time division multiple access (TDMA) slots that re-occur over a predetermined time period. At least some of the slots of the first time period may be reserved for use by each of at least some of the sensors and/or fobs under a 6LowPan/IPv6/IoT or IEEE 802.15.4 protocol.

The second time period of the superframe may be reserved for use by the portable wireless devices under an IEEE802.11 or WiFi protocol. FIG. 1 shows two transceivers 22, 42 (one for the 6LowPan/IPv6/IoT protocol and one for the IEEE802.11 protocol).

Figure 2:
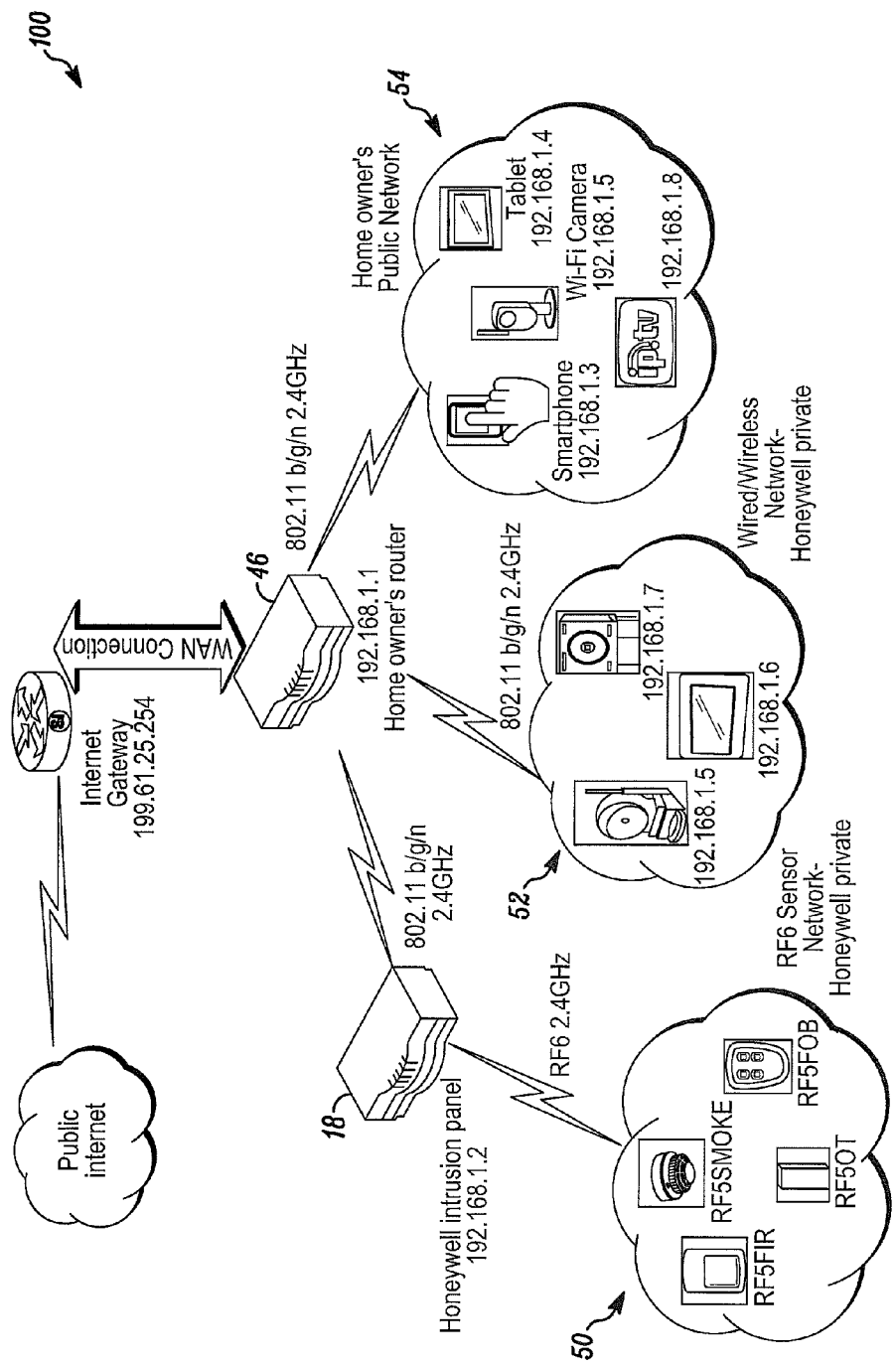
FIG. 2 depicts the system architecture of multidisciplinary technologies and protocols used in a networked system, such as the system of FIG. 1.

FIG. 2 shows a more generalized block diagram of the security system of FIG. 1. In FIG. 2, the home router is separate from the control panel.

As shown in FIG. 2, at least some sensors 50 (of the sensors 12, 14 shown in FIG. 1) communicate directly with the control panel through the first transceiver 22 under the IEEE 802.15.4 protocol. Other sensors, such as IP cameras (shown as part of group 52 in FIG. 2) or WiFi cameras (shown as part of group 54 in FIG. 2) communicate with the control panel under an IEEE 802.11 b/g/n protocol through the home router 46. The video streams from one or more of the WiFi cameras in the network 52 can be streamed onto the display of the intrusion panel 18 via the home router. In this case, the 2.4 GHz bandwidth will be shared between the sensors operating on this bandwidth using the IEEE 802.15.4/6LowPAN/IoT protocol and WiFi devices operating on this bandwidth using the IEEE 802.11 protocol.

Figure 3:
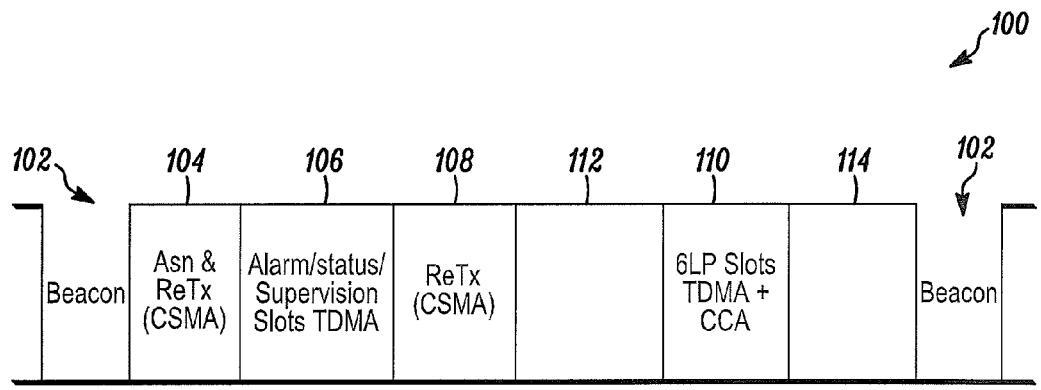
FIG. 3 depicts a superframe that may be used by the system of FIG. 1.

FIG. 3 depicts an example of the superframe 100 used within the system of FIG. 1. The superframe is multidisciplinary because it supports standards such as IEEE802.15.4 and 6LowPan and also facilitates coexistence with other systems such as IEEE802.11 and ZigBee based systems. In this regard, the home router 46 operates to route messages between processors of the control panel, the fobs, the PDs, and at least some of the sensors.

While the second time period is generally used for WiFi traffic, it is polymorphic in that it can also be used for IEEE 802.15.4 traffic. This will be described in more detail below.

As shown, the first time period of the superframe includes a slot 102 for a beacon and a first set of time division multiple access (TDMA) slots 104, 106, 108, 110 reserved for the exchange of messages between the sensors and the control panel and between the fob and the control panel under the IEEE 802.15.4 and 6LowPAN protocol. A second set of slots 112, 114 that define a second time period 110 of the superframe is generally designated for the exchange of messages between the portable wireless devices and the Internet under the WiFi protocol.

The frame may be embodied as a number of time thresholds distributed across the sensors and the coordinators that identify the locations of various markers within the superframe. For example, the slot 102 may be identified by a starting time (i.e., zero seconds) and an ending time (e.g., 5 milliseconds). Similarly, the starting and ending times of each of the slots may be defined by its offset from the start of the superframe. In addition, the frame file may also include an identifier of the type of device allowed to use each slot as well as an indicator of the type of message that may be transmitted in each slot.

The beacon identifies a starting point of the superframe and incorporates a number of data fields defined and populated by a beacon processor. The data fields may include a first field for frame information and one or more control slots.

Figure 4:
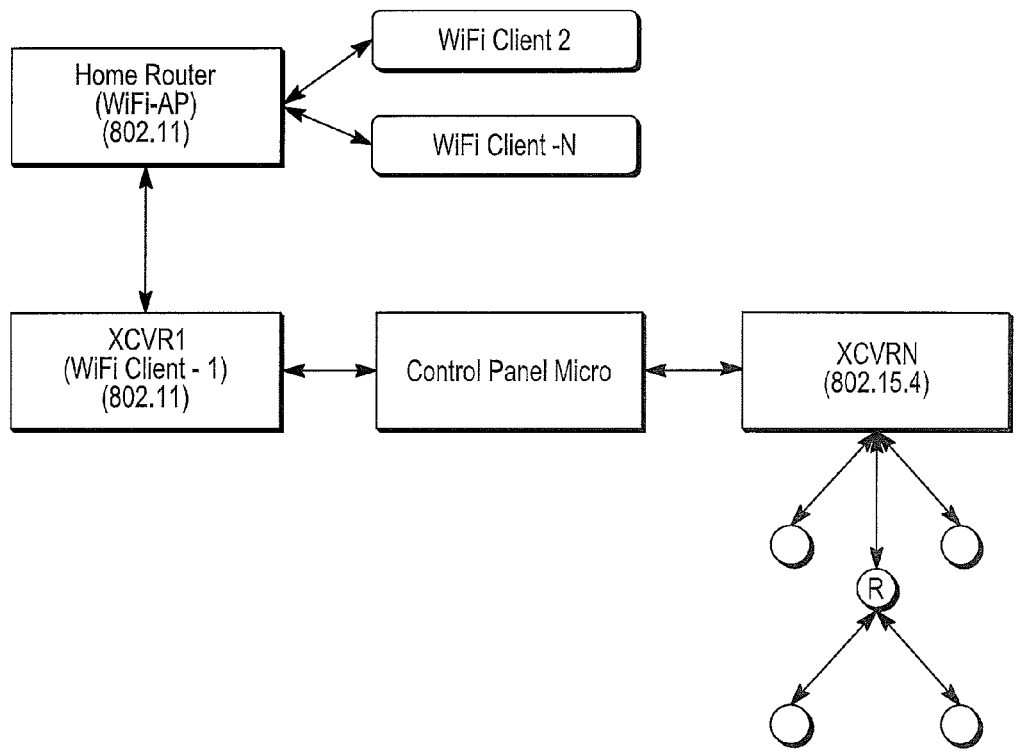
FIG. 4 depicts the wireless network topologies for sensors and WiFi devices that may be used with the system of FIG. 1.

Each device (e.g., sensors, fobs, etc.) in the system has a short address, an IPv6 (6LowPan) address, and a MAC identifier (MAC ID). The addressing system facilitates accessing of the sensors and the fobs by any IPv6 compatible device under Internet of Things (IoT) concepts. This allows the sensors to be arranged by respective processors into star or tree networks as shown in FIG. 4, but not into a mesh network.

The status of the control panel (e.g., armed, disarmed, trouble, etc.) is carried as part of the beacon payload. Also, if required, a detailed indicator of the panel status may be carried within respective slots under the 6LowPAN/802.15.4 protocols.

The control slots of the beacon may be used by a message processor of the control panel to send request messages from the control panel to end devices (e.g., sensors, fobs, etc.) using a unicast, multicast, or broadcast format based upon the IEEE802.15.4 addresses of the end devices.

Within the first set of slots of the superframe, a first portion 106 is reserved for alarm, status, and supervision messages between the control panel and the sensors. As alarms, status and supervision messages have limited data size, an IEEE 802.15.4 packet format is used by a corresponding packet processor to optimize the airtime of these messages. This protocol supports the star or tree topology needed to accommodate scenarios that demand a larger range.

In general, network information from the control panel is based upon a dynamic PAN-ID and a 802.15.4 channel number for single channel operation. Sensors and/or fobs conforming with this information may enroll with the control panel automatically immediately after activation. End device commissioning of each sensor may be based upon a common secret message encryption key and an end device unique MAC-ID.

Sensors may arrange themselves into the star or tree topology including a coordinator, a repeater, and one or more end devices based upon this information. Packet exchanges between parent and child devices may occur using one or more slots of the portions 110, 112 and not the portions 104, 106, 108 114. DNA profile transmissions (i.e., the sensor identifies what it is) and configuration transactions between the coordinator and the end devices may be used to facilitate the arranging of these devices into the star or tree topology.

For end devices that are too far from the control panel, the coordinator will forward the beacon.

Alarms, statuss and supervisory messages to the control panel may result in bi-directional communication between the coordinator and the end devices. Secured encrypted communication over the air for each message may be accomplished using network keys.

Alarm messages from a sensor to the control panel may be accomplished via one of the slots of the second portion 106. In this case, the activated sensor may wake-up upon the occurrence of an event (e.g., fire, intrusion, etc.). An alarm processor within the sensor may detect the event, compose an alarm message, synchronize with its superframe beacon, identify a slot based upon the frame file, and transmit the alarm message at a corresponding location within the superframe. Each slot of the TDMA superframe may include sufficient time for transmission of an encrypted packet plus enough time for a MAC level ACK message from a parent device.

If a sensor does not receive an ACK message within a slot of the first portion 106, then the alarm processor of the sensor may resend the alarm message under a carrier sense multiple access and collision avoidance CSMA/CA algorithm/mechanism. In this case, the activated sensor may select a slot within one of the portions 104, 108 by first attempting to sense other users. If no other user is detected, then the sensor may retransmit the alarm message to the control panel within the selected slot.

The WiFi devices may operate in the time periods 110 to 112 and/or 114. A strobe to the devices operating under this protocol may be sent based upon slot availability at the end of the superframe. Alternatively, the WiFi devices may synchronize via hardwired signals.

The system of FIG. 1 operates on only a single channel. For example, life style and life safety applications can use either an overlapping or non-overlapping frequency in the same 2.4 GHz ISM band. The traffic on this channel may include audio, video, or alarm data or other high volume traffic, such as firmware upgrades, JPEG, or web pages. This traffic is different for different types of applications and requires different bandwidths. For example, video/audio requires bandwidth in the megabyte range while alarm data only requires a few bytes.

On the other hand, the different applications sending data through the single channel have different priorities. For example, the alarm data cannot be postponed and has to be sent immediately in the context of life safety. Video streaming of data from the IP cameras shown in FIG. 2 will occur in real time whereas JPEG data will not occur in real time and can be delayed.

The latency requirements of the system are also different. For example, UL standards require that alarms be forwarded to the control panel within a few seconds. On the other hand, firmware upgrades can be postponed and can occur over a period involving many hours.

In prior art systems, a 2.4 GHz network was used for life style applications while life safety applications were handled using a sub-GHz network (e.g., 868 MHz, 902 MHz, etc.). Hence, there was no need for prior art applications to share their bandwidth between life style and life safety applications because each had its own operating area (different frequency of operation) and dedicated bandwidths.

The superframe of the system of FIG. 1 may be dynamically adjusted during startup by discovery. For example, the first time period (i.e., the 802.15.4 time period) may be determined by a dimensioning processor based upon the number of sensors that register with the system and by a proportional number of slots that is determined based upon the registered sensors.

Similarly, the second or 802.11 time period may be determined via a discovery processor. For example, the processor may first use a discovery mechanism to determine the number of WiFi cameras in the system and then the number of 802.11 b, g, or n type cameras. Next, the processor may query the cameras to determine a set of operating characteristics (e.g., frames per second (fps), resolution, etc.). The full bandwidths of each of the cameras may be combined to provide an estimate of the second time period. The first and second time periods may then be combined and compared to a minimum response to determine if any extra or remaining time is available. The remaining time may be used by the sensors for the retransmission of alarms.

It should be noted that the actual data transmission times of the cameras would not occupy all of the second time period since it is highly unlikely that all of the cameras would be transmitting simultaneously. Accordingly, a polymorphic method of use may be implemented within the second time period, wherein the same time segment is used by a scheduling processor to handle different types of data. For example, the processor may temporarily (or semipermanently) schedule a portion of the second time period for enrollment or re-enrollment of the sensors over the 802.15.4 network. Similarly, the processor may reserve a portion of the second time period for other high volume traffic (e.g., JPEG, firmware upgrades to the sensors, etc.). In all cases, the WiFi traffic is not allowed, and the 802.15.4 traffic has a higher relative priority. While polymorphism can be viewed as the use of the second time period for 802.15.4 data, polymorphism could also be viewed as shifting the boundary between the first and second time periods.

Any of the use cases may be implemented within the system. Under one embodiment, a priority processor may control a priority of polymorphism. Under some conditions, the second time period will be used for life style applications to transmit and receive life style data. However, in case of other 802.15.4 traffic (e.g., 6LowPAN based request/response or over the air/network download (OND)), all or a portion of the second time period will be stolen to be used by the 802.15.4 system.

In the case of security alarms transmitted from the control panel to the central monitoring station, the priority is inverted. In this situation, the transmission of WiFi data (which is normally given a low priority) is given the highest priority. For example, if the control panel needs to send an alarm message to the central monitoring station via a WiFi transmission, then that transmission will be given priority even over other 802.15.4 data. Similarly, if an alarm is received by the control panel from a WiFi camera, then the priority of the 802.15.4 data will be inverted, and the WiFi video/audio from the WiFi camera to the control panel is given the highest priority.

In general, the system may include a control panel having a first wireless transceiver that operates under an IEEE 802.15.4 or equivalent protocol and a second wireless transceiver that operates under an IEEE 802.11 protocol, wherein the first and second wireless transceivers can operate on an overlapping or non-overlapping radio frequency (RF) band or channel, and wherein the second wireless transceiver occasionally provides WiFi access to portable user devices, a beacon processor of the control panel that transmits a beacon through the first wireless transceiver, wherein the beacon defines a repeating superframe having a first time period divided into a number of time division multiple access (TDMA) slots and a second time period for the WiFi access, a plurality of remotely located, wireless devices of the control panel each having a respective wireless transceiver, wherein at least some of the plurality of remotely located, wireless devices exchange messages with the control panel within a respective TDMA slots of the superframe on the RF band or channel, and an access processor within the control panel that dynamically adjusts relative sizes of the first and second time periods to reduce or exclude the WiFi access by the portable user devices based upon a status of the plurality of remotely located, wireless devices, wherein use of the second time period is polymorphic under the IEEE 802.11 and IEEE 802.15.4 or equivalent protocols, and wherein relative priorities of the first and second time periods are inverted during transmissions between the control panel and other devices of the control panel.

Alternatively, the system may include a control panel having a first wireless transceiver that operates under an IEEE 802.15.4 or equivalent protocol and a second wireless transceiver that operates under an IEEE 802.11 protocol, wherein the first and second wireless transceivers operate on an overlapping or non-overlapping radio frequency (RF) band or channel, a beacon processor of the control panel that transmits a beacon through the first wireless transceiver, wherein the beacon defines a repeating superframe having a first time period in which messages are processed by the control panel under the IEEE 802.15.4 or equivalent protocol and a second time period in which the messages may be processed under the IEEE 802.11 protocol, a plurality of remotely located, wireless devices of the control panel each having a respective wireless transceiver, wherein each of the plurality of remotely located wireless devices exchanges the messages with the control panel during the first time period within a respective time division multiple access (TDMA) slot of the superframe on the RF band or channel, and an access processor within the control panel that dynamically adjusts relative sizes of the first and second time periods, wherein adjusting the relative size of the second time period affects independent use of the RF band or channel by outside portable user devices based upon a status of the plurality of remotely located, wireless devices, wherein use of the second time period by the control panel and the plurality of remotely located, wireless devices is polymorphic under the IEEE 802.11 and IEEE 802.15.4 or equivalent protocols, and wherein relative priorities of the first and second time periods is are inverted during transmissions between the control panel and other devices of the control panel.

Alternatively, the system may include a security system that protects a secured area, a control panel of the security system, wherein the control panel has a first wireless transceiver that operates under an IEEE 802.15.4 or equivalent protocol and a second wireless transceiver that operates under an IEEE 802.11 protocol, wherein the first and second wireless transceivers operate on an overlapping or non-overlapping radio frequency (RF) band or channel, and wherein the second wireless transceiver occasionally and independently provides WiFi access to portable user devices, a beacon processor of the control panel that transmits a beacon through the first wireless transceiver, wherein the beacon defines a repeating superframe, and wherein the superframe has a first time period that is divided into a number of time division multiple access (TDMA) slots and a second time period, a plurality of remotely located, wireless sensor devices of the control panel, wherein the plurality of remotely located, wireless sensor devices each have a respective wireless transceiver, and wherein at least some of the plurality of remotely located, wireless devices exchange messages with the control panel within respective TDMA slots of the superframe on the RF band or channel, and an access processor within the control panel that dynamically adjusts use of the first and second time periods to reduce or exclude the WiFi access by the portable user devices based upon a status of the plurality of remotely located, wireless sensor devices, wherein the use of the second time period is polymorphic under the IEEE 802.11 and IEEE 802.15.4 or equivalent protocols, and wherein relative priorities of the first and second time periods are inverted during transmissions between the control panel and other devices of the control panel.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
a control panel having a first wireless transceiver that operates under an IEEE 802.15.4 or equivalent protocol and a second wireless transceiver that operates under an IEEE 802.11 protocol, wherein the first wireless transceiver and the second wireless transceiver operate on a single radio frequency channel and the second wireless transceiver provides WiFi access to portable user devices;
a beacon processor of the control panel that transmits a beacon through the first wireless transceiver, wherein the beacon defines a repeating superframe having a first time period divided into a first number of time division multiple access slots and a second time period for the WiFi access;
a plurality of remotely located wireless devices of the control panel, wherein each of the plurality of remotely located wireless devices includes a respective wireless transceiver and at least one of the plurality of remotely located wireless devices exchanges messages with the control panel within a respective one of the time division multiple access slots of the repeating superframe on the single radio frequency channel; and
a scheduling processor within the control panel that schedules use of a single time segment within the second time period for handling both a first data type associated with the first wireless transceiver and a second data type associated with the second wireless transceiver using a polymorphic method based on relative priorities of the first data type and the second data type,
wherein the relative priorities of the first data type and the second data type are inverted when an alarm message is sent from the second wireless transceiver.

2. The system as in claim 1 wherein the single time segment is used to enroll or re-enroll at least some of the plurality of remotely located wireless devices with the control panel under the IEEE 802.15.4 or equivalent protocol.

3. The system as in claim 1 wherein the plurality of remotely located wireless devices includes at least one IP camera.

4. The system as in claim 3 wherein the single time segment is used to download frames of video images from the at least one IP camera to the control panel under the IEEE 802.15.4 or equivalent protocol.

5. The system as in claim 1 wherein the single time segment is used to download software to at least some of the plurality of remotely located wireless devices under the IEEE 802.15.4 or equivalent protocol.

6. The system as in claim 1 wherein the beacon is transmitted using a 6LowPAN protocol.

7. The system as in claim 1 wherein the control panel and the plurality of remotely located wireless devices further comprise a security system.

8. The system as in claim 7 wherein at least some of the plurality of remotely located wireless devices include fire detectors or intrusion detectors.

9. The system as in claim 7 wherein at least some of the plurality of remotely located wireless devices include alarm annunciators.

10. The system as in claim 1 further comprising a third processor of the control panel that determines a duration of the first time period and the first number of the time division multiple access slots within the first time period based upon a total number of the plurality of remotely located wireless devices, wherein a relative size of the first time period is based upon the total number of the plurality of remotely located wireless devices.

11. The system as in claim 10 wherein the single time segment is used to enroll or re-enroll at least some of the plurality of remotely located wireless devices with the control panel under the IEEE 802.15.4 or equivalent protocol.

12. The system as in claim 10 wherein the plurality of remotely located wireless devices includes at least one IP camera.

13. The system as in claim 12 wherein the single time segment is used to download frames of video images from the at least one IP camera to the control panel under the IEEE 802.15.4 or equivalent protocol.

14. The system as in claim 10 wherein the single time segment is used to download software to at least some of the plurality of remotely located wireless devices under the IEEE 802.15.4 or equivalent protocol.

15. A system comprising:
a security system that protects a secured area;
a control panel of the security system having a first wireless transceiver that operates under an IEEE 802.15.4 or equivalent protocol and a second wireless transceiver that operates under an IEEE 802.11 protocol, wherein the first wireless transceiver and the second wireless transceiver operate on a single overlapping or non-overlapping radio frequency band and the second wireless transceiver provides WiFi access to portable user devices;
a beacon processor of the control panel that transmits a beacon through the first wireless transceiver, wherein the beacon defines a repeating superframe having a first time period that is divided into a number of time division multiple access slots and a second time period;
a plurality of remotely located wireless sensor devices of the control panel, wherein each of the plurality of remotely located wireless sensor devices includes a respective wireless transceiver and at least one of the plurality of remotely located wireless sensor devices exchanges messages with the control panel within a respective one of the time division multiple access slots of the superframe on the single overlapping or non-overlapping radio frequency band; and
scheduling processor within the control panel that schedules use of a single time segment within the second time period for handling both a first data type associated with the first wireless transceiver and a second data type associated with the second wireless transceiver using a polymorphic method based on relative priorities of the first data type and the second data type, wherein the relative priorities of the first data type and the second data type are inverted when an alarm message is sent from the second wireless transceiver.

16. The system as in claim 15 further comprising a third processor of the control panel that adjusts relative sizes of the first time period and the second time period based upon a relative level of message traffic between the control panel and the plurality of remotely located wireless sensor devices.

* * * * *